United States Patent [19]
Becker

[11] 3,899,887
[45] Aug. 19, 1975

[54] HYDRAULIC COUPLING WITH RESERVOIR

[75] Inventor: John E. Becker, Bowmanville, Canada

[73] Assignee: Cluaran Associates Ltd., Oshawa, Canada

[22] Filed: Sept. 11, 1974

[21] Appl. No.: 504,886

[30] Foreign Application Priority Data
Sept. 18, 1973 United Kingdom............... 43632/73

[52] U.S. Cl..................................... 60/347; 60/357
[51] Int. Cl.² .......................................... F16D 33/06
[58] Field of Search ............. 60/347, 351, 357, 359

[56] References Cited
UNITED STATES PATENTS
2,280,042  4/1942  Duffield................................ 60/360
2,377,851  6/1945  Blank................................... 60/358
2,570,768  10/1951  Clerk................................... 60/357

Primary Examiner—Edgar W. Geoghegan
Attorney, Agent, or Firm—Stanley J. Rogers

[57] ABSTRACT

The application is concerned with hydraulic couplings of the type having a reservoir into which the coupling working liquid can be transferred to reduce its power transmission capacity. This reservoir is movable between a coupling emptying position in which the liquid flows into it from the coupling under gravity, and a coupling filling position in which the liquid flows from the reservoir to the coupling interior under gravity.

10 Claims, 12 Drawing Figures

HYDRAULIC COUPLING WITH RESERVOIR

FIELD OF THE INVENTION

The present invention is concerned with improvements in or relating to hydraulic couplings, and especially to such couplings having a reservoir into which working liquid of the coupling can be transferred to reduce its power transmission capacity.

DEFINITION OF THE INVENTION

It is an object of the invention to provide a new hydraulic coupling of the type having a reservoir wherein clutching and declutching can be obtained by movement of the reservoir.

In accordance with the present invention there is provided a new hydraulic coupling comprising cooperating pump and turbine elements each having radial vortex-producing vanes and together forming a working chamber, a reservoir for working fluid operative with at least one of the pump and turbine elements, the reservoir being movable between a coupling emptying position in which coupling working liquid can flow thereto from the working chamber under gravity and a coupling filling position in which coupling working liquid can flow therefrom to the working chamber under gravity.

DESCRIPTION OF THE DRAWINGS

Particular preferred embodiments of the invention will now be described, by way of example, with reference to the accompanying diagrammatic drawings, wherein.

DESCRIPTION OF THE PREFERRED EMBODIMENTS

Figure 1:
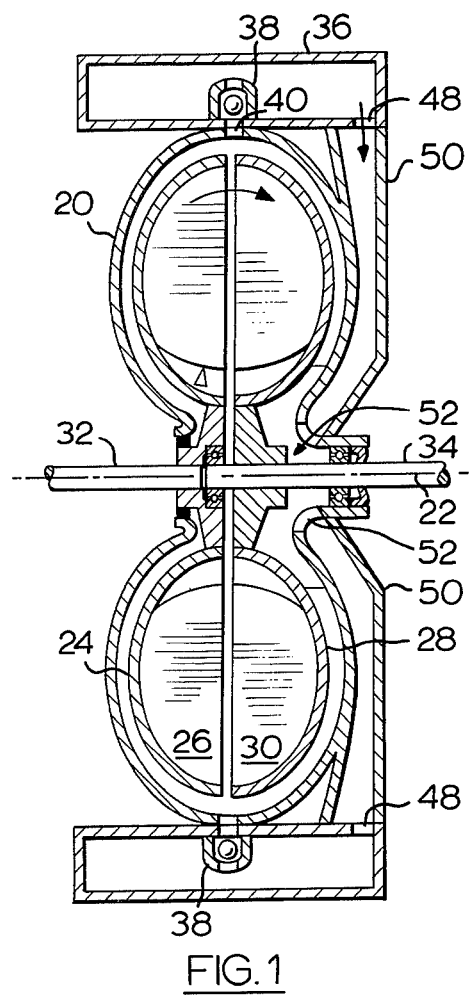
FIG. 1 is a plane horizontal cross-section through a first embodiment.

Similar parts are given the same reference in all the figures of the drawings.

A first embodiment consists of an external casing 20 in which are mounted for rotation about a common axis 22 a pump element 24 having radial vortex-producing vanes 26 and a turbine element 28 having corresponding vanes 30, the two elements forming corresponding chambers that together constitute a working chamber and being mounted on respective input shaft 32 and output shaft 34.

A reservoir 36 of semi-annular shape (see FIG. 2) is mounted on the exterior of the casing 20 radially outwardly therefrom and has its interior connected at opposite ends to the interior of the working chamber via respective valves 38. Thus, an opening 40 leads from the working chamber interior to another opening 42 which leads in turn via the interior of the valve chamber and another opening 44 to the interior of the reservoir. Each valve comprises a weight 46 movable under its own weight in the valve chamber and capable of closing the opening 42.

Another pair of openings 48 in the ends of the reservoir connect the interior thereof to respective radially extending ducts 50, which discharge via openings 52 as close as possible to the output shaft 34.

Figure 2:
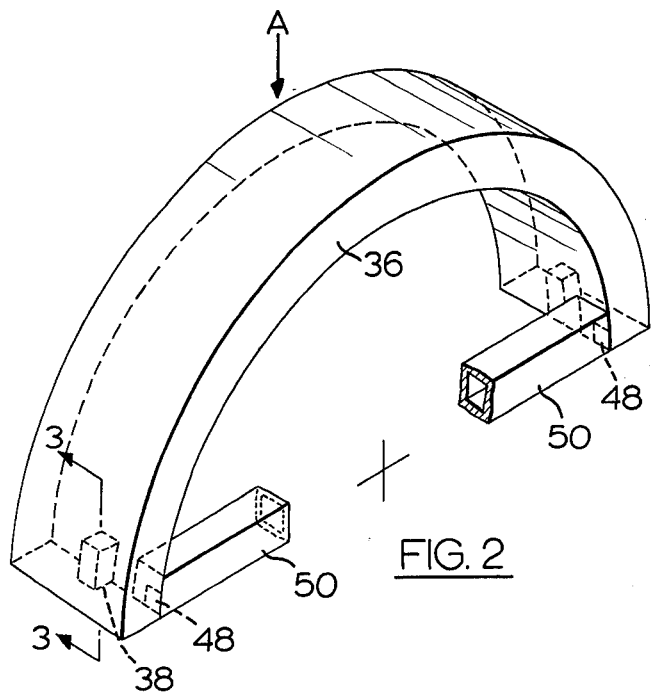
FIG. 2 is a perspective view of the coupling reservoir only showing it in position to deliver its contents to the coupling working circuit.
Figure 3:
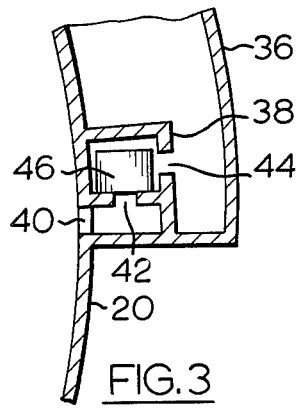
FIG. 3 is a cross-section on the line 3—3 of FIG. 2 to illustrate a detail of a valve.

If the coupling is to be engaged, then the reservoir is moved to the position about the coupling illustrated in FIGS. 2 and 3, wherein the liquid therein flows by gravity through the ducts 50 and openings 52 into the space between the pump and turbine, if holes are provided in the turbine hub, or into the space between casing 20 and the turbine if such holes are not provided, from whence it enters the working chamber. The reservoir cannot receive liquid from the circuit because the valve weight 46 is closing the aperture 42, as illustrated by FIG. 3.

Figure 5:
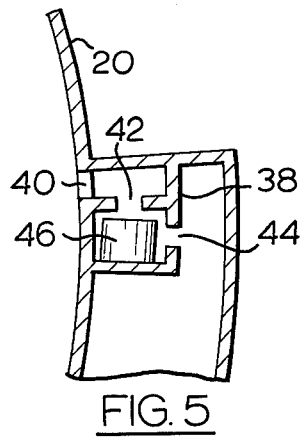
FIG. 5 is a cross-section on the lines 5—5 of FIG. 4.
Figure 4:
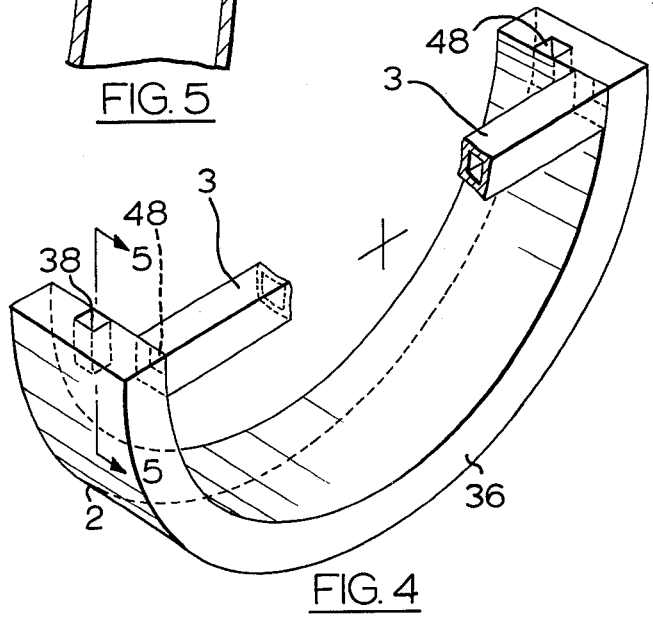
FIG. 4 is a perspective view similar to FIG. 2, showing the coupling reservoir in position to receive the contents of the coupling working circuit.
Figure 6:
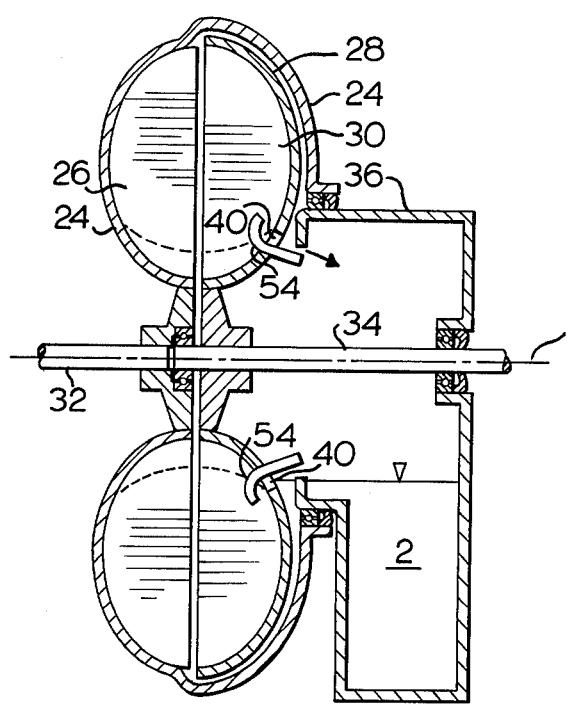
FIG. 6 is a vertical plane cross-section through a second embodiment with the reservoir in position to cause disengagement of the coupling.
Figure 7:
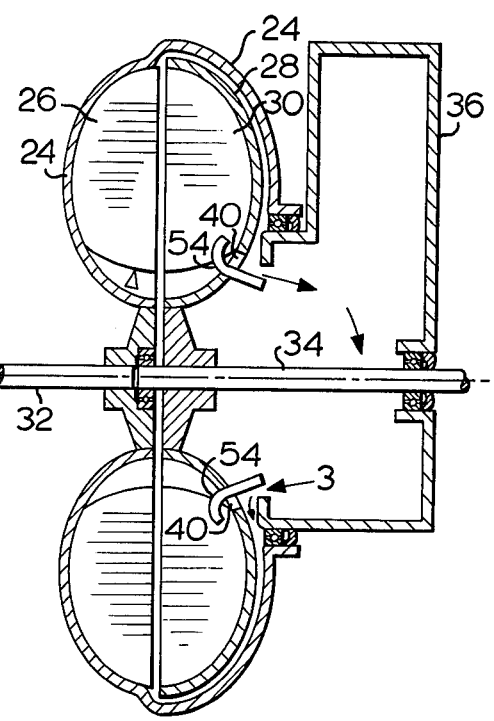
FIG. 7 is a similar cross-section to FIG. 6 with the reservoir in position to cause engagement of the coupling.
Figure 8:
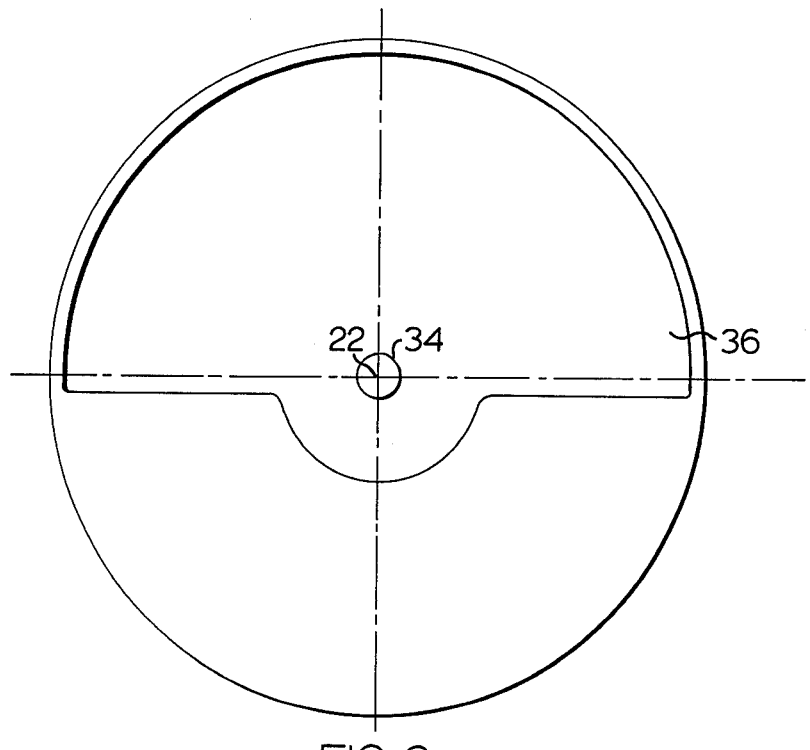
FIG. 8 is an end view corresponding to FIG. 7, FIGS. 9 and 10 are respectively similar cross-sections to FIGS. 6 and 7 of a third embodiment.

If the coupling is to be disengaged then the reservoir is swung to the position below the coupling illustrated by FIGS. 4 and 5, wherein the valves 38 have moved to open condition and the liquid in the working circuit can drain therethrough into the reservoir interior. The size of the reservoir is made such that no liquid can return through the ducts to the working circuit, until the reservoir is again moved. In the embodiment illustrated by FIGS. 6 to 8 the reservoir is mounted alongside the coupling, thus reducing the external diameter, but increasing the axial length. In the disengaged position illustrated by FIG. 6 the fluid moving in the working chamber is caught by catches 54 and guided into the reservoir, which is so dimensioned that fluid does not overflow back into the circuit. In the engaged position illustrated by FIGS. 7 and 8 the liquid which enters the reservoir flows immediately back into the working circuit.

Figure 9:
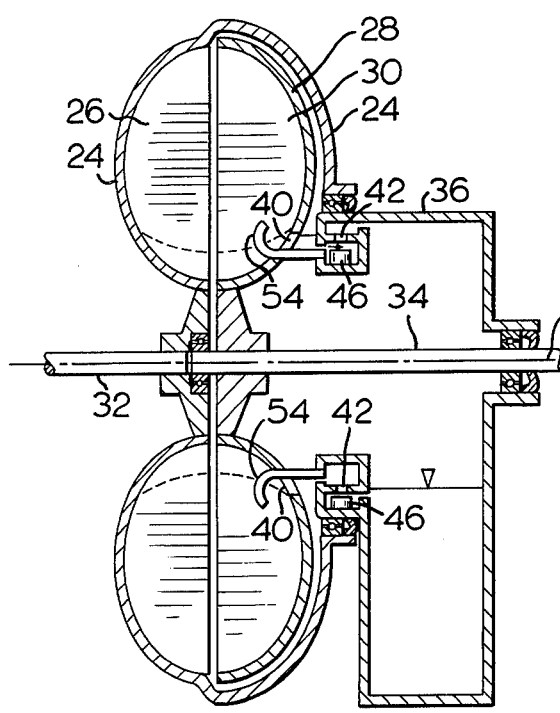
Figure 10:
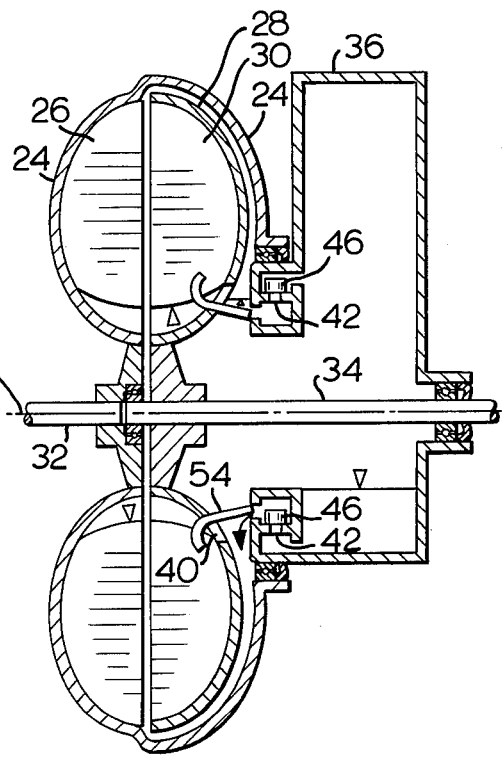

The embodiment illustrated in FIGS. 9 and 10 is provided with valves and catches, the valves preventing the liquid from entering the reservoir when the coupling is in the engaged condition, so that the above-mentioned constant flow is avoided.

Figure 11:
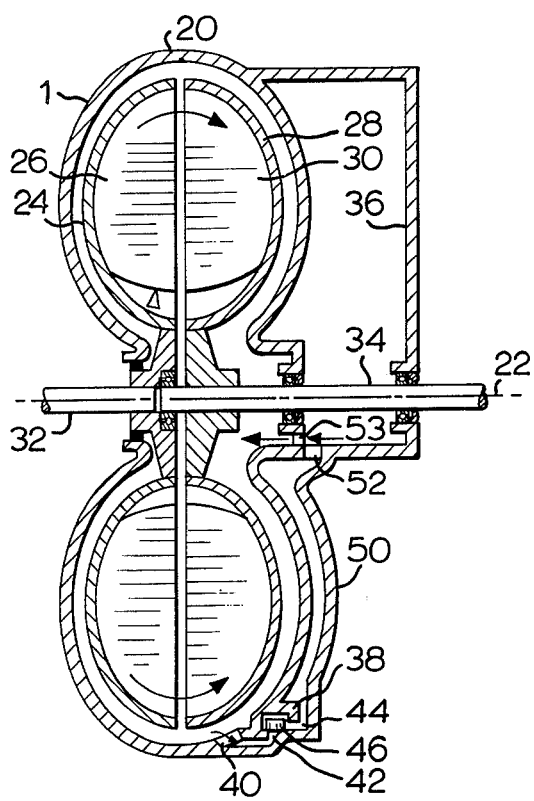
FIGS. 11 and 12 are respectively similar cross-sections to FIGS. 6 and 7 of a fourth embodiment.
Figure 12:
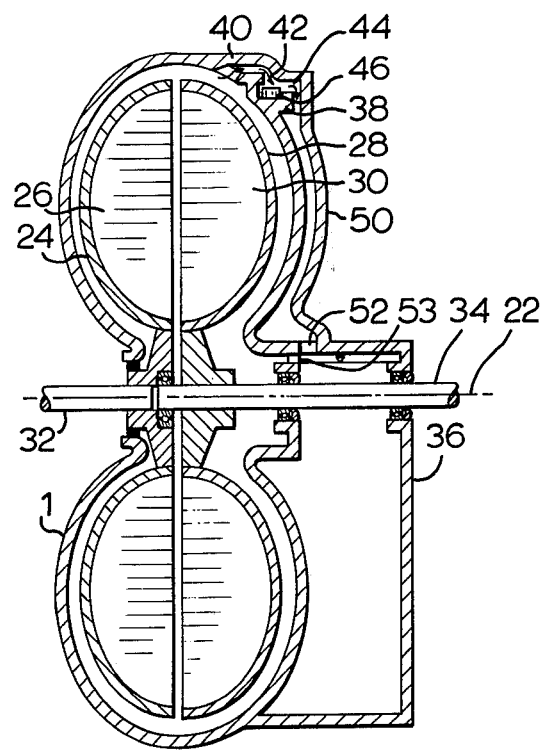

In the embodiment of FIGS. 11 and 12 the reservoir is covered by a shell 20 surrounding the pump and turbine, the interior of the reservoir connecting to the working circuit interior via ducts 50. In the engaged position illustrated by FIG. 11 the liquid has entered the coupling through the openings 52 and 53, while valve member 46 closes the opening 42 and prevents liquid escaping into the duct. When the reservoir is swung to the disengaged position of FIG. 12 liquid flows through openings 42, 52 and 53.

I claim:

1. A hydraulic coupling comprising cooperating pump and turbine elements each having radial vortex-producing vanes and together forming a working chamber, a reservoir for working fluid operative with at least one of the pump and turbine elements, the reservoir being movable between a coupling emptying position in which coupling working liquid can flow thereto from the working chamber under gravity and a coupling filling position in which coupling working liquid can flow therefrom to the working chamber under gravity.

2. A hydraulic coupling as claimed in claim 1, wherein an external casing surrounds the pump and turbine elements and the reservoir is mounted on the casing radially outwardly therefrom with its interior connected to the interior of the working chamber at the radially outermost part of the chamber.

3. A hydraulic coupling as claimed in claim 2, wherein the reservoir is of semi-annular shape and is provided at its ends with radially extending ducts conveying liquid from the reservoir interior into the working chamber close to the axis of rotation of the coupling.

4. A hydraulic coupling as claimed in claim 2, wherein there are provided position-sensitive valves through which the reservoir interior is connected to the working chamber interior at the radially outermost part of the latter, the said valves being open when the reservoir is in the coupling emptying position and closed when it is in the coupling filling position.

5. A hydraulic coupling as claimed in claim 4, wherein the said valves are weight operated.

6. A hydraulic coupling as claimed in claim 1, wherein an external casing surrounds the pump and turbine elements, the reservoir is mounted on the casing alongside the working chamber, and the working chamber is provided with means directing the liquid therein into the reservoir interior.

7. A hydraulic coupling as claimed in claim 6, wherein there are provided position-sensitive valves through which the reservoir interior is connected to the working chamber interior, the said valves being open when the reservoir is in the coupling emptying position and closed when it is in the coupling filling position.

8. A hydraulic coupling as claimed in claim 7, wherein the said valves are weight operated.

9. A hydraulic coupling as claimed in claim 6, wherein the means directing liquid from the working chamber into the reservoir comprise catch means intercepting the liquid in the working chamber.

10. A hydraulic coupling as claimed in claim 9, wherein there are provided position-sensitive valves through which the said catch means direct liquid from the working chamber into the reservoir, the said valves being open when the reservoir is in the coupling emptying position and closed when it is in the coupling filling position.

* * * * *